Aug. 28, 1934.                    M. PIRANI                    1,971,941
                    ELECTRIC DISCHARGE LAMP DEVICE
                         Filed July 10, 1933
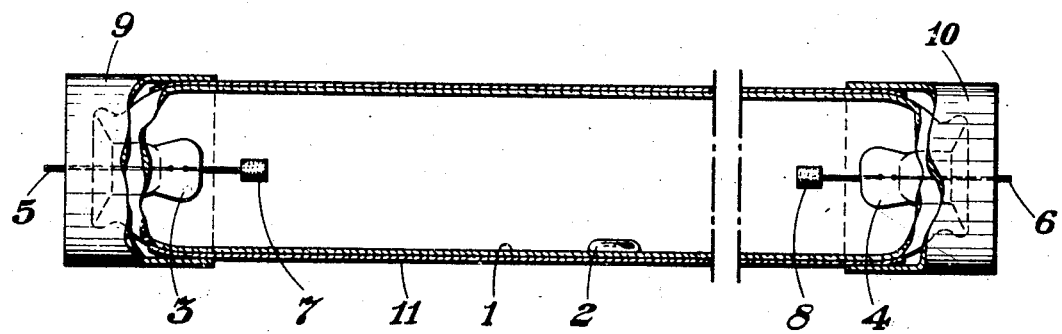
INVENTOR
Marcello Pirani
BY Harry E. Dunham
ATTORNEY Patented Aug. 28, 1934

1,971,941

UNITED STATES PATENT OFFICE

1,971,941

ELECTRIC DISCHARGE LAMP DEVICE

Marcello Pirani, Berlin-Wilmersdorf, Germany, assignor to General Electric Company, a corporation of New York Application July 10, 1933, Serial No. 679,785
In Germany July 22, 1932

1 Claim. (Cl. 176—122)

The present invention relates to electric discharge lamp devices generally and more particularly the invention relates to such devices useful in producing yellow colored light.

Electric discharge lamp devices having gaseous fillings consisting of helium or a mixture of helium and neon and provided with a yellow filter produce a substantially pure yellow light. The starting and operating voltage of electric discharge lamps having such gaseous filling is higher than those of lamps having a neon filling or a mercury filling. The object of the present invention is to provide a gaseous electric discharge lamp device for the production of pure yellow light which has a lower starting and operating voltage and is more efficient than prior devices. Still further objects, and advantages attaching to the device and its use and operation will be apparent to those skilled in the art from the following particular description.

In accordance with this object the invention comprises an electric discharge lamp device having a gaseous atmosphere therein comprising mercury vapor, a yellow filter in operative relation to said lamp device and a translucent glass interposed between said lamp device and the eye of an observer. Color filters have been used in conjunction with electric discharge lamp devices to produce light of various colors, for example, yellow green or brown filters have been used in conjunction with mercury vapor filled lamp devices to produce a green colored light. Yellow filters used in conjunction with such lamp devices have not been successful in the production of pure or typical yellow light since the end parts of the lamp, in the region of the electrodes, emits a strong green colored light which the usual yellow filters cannot successfully screen out. The undesired green rays can be screened out by so-called "perfect" yellow filters but the light produced is then not a yellow light but a brown light of low intensity.

I have discovered that a translucent glass, such as a matte glass or an opal glass, successfully screens out the objectionable green light so that a mercury vapor lamp provided with a normal yellow filter and an opal glass container, for example, emits a pure yellow light from all parts thereof. The apparent explanation for this unexpected result is that the opal glass has greater cut off power in the short wave part of the visible spectrum than in the long wave part thereof and that part of the green light which is not affected by the yellow filter is cut off by the opal glass. The arrangement of the yellow filter and the opal glass is not critical, that is the yellow filter is placed between the eye of the observer and the opal glass, or vice versa, as desired.

Thus a typical yellow light having a low green content and which differs sharply from the orange yellow light also present in the mercury vapor spectrum is produced by a mercury vapor lamp which is a more efficient lamp than similar lamp devices filled with helium or with a mixture of helium and neon. The lamp device made in accordance with the present invention emits a pure or typical yellow light from all parts thereof.

In the drawing accompanying and forming part of this specification an embodiment of the invention is shown in a side elevational, partly sectional view.

Referring to the drawing the new and novel gaseous electric discharge device for producing typical yellow light comprises a tubular container 1 made of an opal or matte glass. Said container 1 has a gaseous atmosphere therein comprising mercury vapor and is, for example, a mixture of a starting rare gas, such as argon or neon, and mercury vapor. The mercury pool 2 is the source of the mercury vapor. When the lamp device is started into operation the electric discharge therein is conducted by the rare gas until the heat of the discharge vaporizes the mercury of pool 2. The spectrum of the light emitted by the mercury vapor discharge predominates over the spectrum of the light emitted by the rare gas during the operation of the device. Current leads 5 and 6 having electrodes 7 and 8 mounted thereon respectively are sealed into the stems 3 and 4 respectively of said container 1. Said electrodes 7 and 8 are of the sintered, mixed metal and oxide type and are electron emitting when heated. Base members 9 and 10 are provided at the ends of said container 1. A yellow filter 11 is placed over the container 1 completely covering said container 1 between the bases 9 and 10. Said filter 11 is of glass or other suitable material. A lamp device having the above structure emits light of a typical yellow color from all parts thereof.

While I have shown and described and have pointed out in the annexed claims certain novel features of the invention, it will be understood that various omissions, substitutions and changes in the forms and details of the device illustrated and in its use and operation may be made by those skilled in the art without departing from the broad spirit and scope of the invention, for example, different types of electrodes such as cold sheet metal electrodes, liquid electrodes, or heated electrodes can be used in place of those shown and described, when desired.

What I claim as new and desire to secure by Letters Patent of the United States is:—

In combination a gaseous electric discharge lamp comprising a translucent container, electrodes sealed therein, a gaseous atmosphere therein comprising mercury vapor, and a yellow filter in operative relation to said device, said container and said filter screening out the light other than the yellow light emitted by said lamp.

MARCELLO PIRANI.